May 13, 1941.　　　　F. KLEIN　　　　2,242,002
CONTROL DEVICE
Filed Oct. 10, 1938
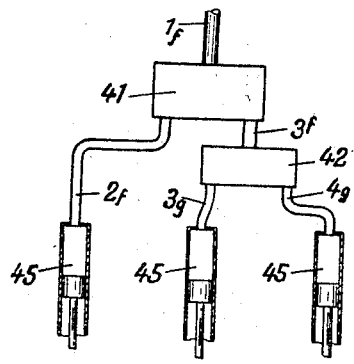
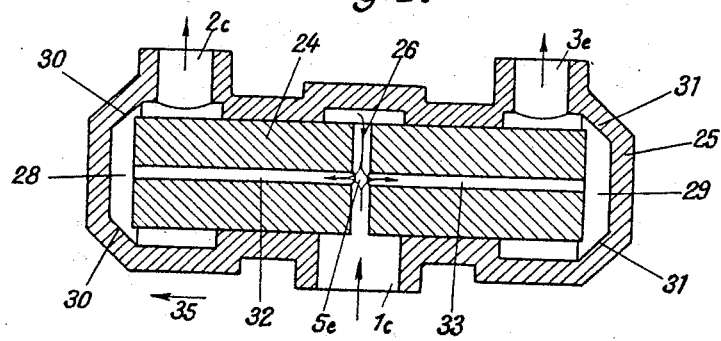
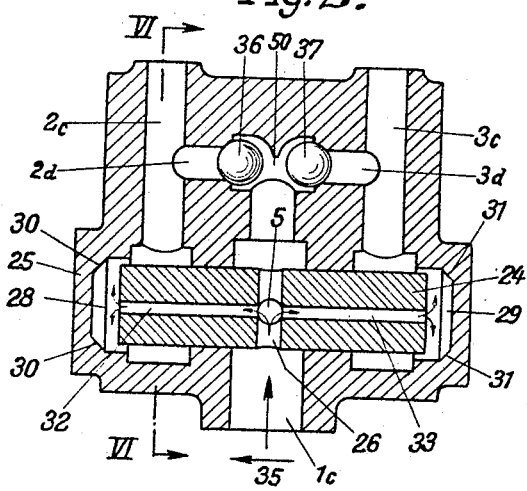
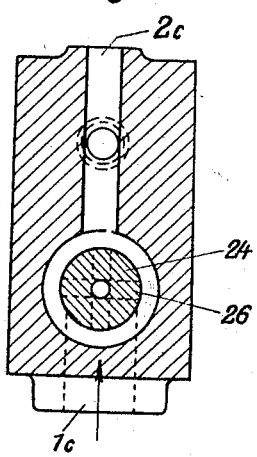
Inventor:
Friedrich Klein
By Gerald F. Baldwin
Attorney Patented May 13, 1941

2,242,002

UNITED STATES PATENT OFFICE 2,242,002

CONTROL DEVICE

Friedrich Klein, Dessau, Germany, assignor to Junkers Flugzeug-und-Motorenwerke Aktiengesellschaft, Dessau, Germany, a corporation of Germany Application October 10, 1938, Serial No. 234,258

8 Claims. (Cl. 137—166)

This invention relates to control devices for automatically regulating the proportionate speeds of flow of liquid under pressure passing from a common main through a plurality of branches.

If a column of liquid under pressure is discharged from a common main through a plurality of separate branches it is obvious that if greater resistance is offered to the flow through one branch that flow is retarded, and the flow through the branch, or branches, to which less resistance is offered is correspondingly accelerated. However it is often desirable to maintain the speed of flow through all the branches either the same, or in fixed proportion, even when the resistance encountered by the flow in one branch is greater than that encountered in the other branch or branches. For instance in the case of airplane landing gear wherein two halves thereof are operated hydraulically by liquid flowing from a common main through separate branches one connected to each half of the gear, it is highly desirable that the two separate halves of the gear be retracted or projected absolutely simultaneously although greater resistance, due to friction or some other cause, may have to be overcome by the liquid flowing through one branch which would normally retard the movement of the half of the gear operated thereby, and result in the movement of one half of the gear ahead of the other. Or again the necessity for absolutely simultaneous operation is even more imperative in the case of two laterally opposed airplane landing brakes operated hydraulically by liquid flowing through two separate branches connected to a common main.

It is an object of the invention to provide a control device for proportionately regulating the flow of liquid under pressure from a main through a plurality of branches so that the speed of flow through each branch is maintained constant relative to the speed of flow through each other branch; and whereby the flow of liquid under pressure from the main is automatically maintained at proportionate speeds, or a common speed, through all the branches connected thereto irrespective of differences in resistance offered to the flow in the various branches.

Another object of the invention is to provide a control device for proportionately regulating the speed of flow of liquid under pressure from a main through a plurality of branches which is hydrodynamically operated by the flow.

A further object of the invention is to provide a control device for regulating the speed of flow of liquid under pressure passing from a main through a branch consisting of a control actuated by the speed of flow of the liquid through the branch, and a valve means actuated by the control for regulating the cross sectional area of a port in that branch through which the liquid flows so that the control automatically regulates the size of the port according to the resistance to be overcome by the flow through that branch.

Yet another object of the invention is to provide a control device for proportionately regulating the speed of flow of liquid under pressure from a main through two branches consisting of a common control for valving a port in each branch; and operated by the relative pressures of the liquid in the two branches; thus increased pressure, which means a retarded rate of flow, in one branch automatically moves the control and increases the cross sectional area of the port, and consequently increases the speed of flow, in that branch, and also decreases the cross sectional area of the port in the other branch thereby reducing the speed of flow therethrough, thus equalizing the speed of flow through both branches.

Having thus briefly stated some of the major objects and advantages of the invention I will now proceed to describe some of the preferred embodiments thereof with the aid of the accompanying drawing, in which:

Figure 1 is a sectional view showing one form of the invention wherein one control equalizes the speed of flow through two branches in each of which a port is provided the size of both of which is regulated by the relative speeds of flow of the liquid through the two branches.

Figure 2 is a sectional view showing the construction illustrated in Figure 1 wherein return valves are provided to permit the liquid to flow from the branches back into the main.

Figure 3 is a section on the line VI—VI of Figure 2.

Figure 4 is a diagrammatic view showing how the constructions illustrated in Figures 1 and 2 may be applied when liquid under pressure is to flow at constant proportionate velocities from a main through more than two branches.

In the construction shown in Figures 1, 2 and 3, a cylinder 25 has a long piston 24 therein for axial movement. Extending laterally from the cylinder adjacent opposite ends thereof are pipes 2c and 3c, and opening into the cylinder substantially centrally of its length is a main 1c.

Formed radially through the piston 24 are passages 26 which are materially narrower than the main 1c and are in communication therewith in all positions of the piston in the cylinder. Extending axially through the piston 24 in opposite directions from the passage 26 are apertures 32 and 33 which connect with the said passages at a throat 5c. Formed in opposite extremities of the cylinder 25 are chambers 28 and 29 in which the pipes 2c and 3c terminate. These chambers 28 and 29 are provided with inclined annular side walls 30 and 31 respectively between which and the adjacent peripheral extremities of the piston 24 annular ports are formed connecting the outer portions of the chambers into which the apertures 32 and 33 open with their inner portions from which the said pipes extend. Thus the pipe 2c, the chamber 28 and the aperture 32 form one branch extending from the throat 5c, and the other pipe 3c, the chamber 29 and the aperture 33 form a second branch also extending from the throat 5c.

The operation is as follows: Liquid under pressure passes through the main 1c and the radial passages 26 through the throat 5c to the apertures 32 and 33 through which it flows into the chambers 28 and 29. So long as the static pressure in both the chambers remains the same the piston 24 remains centrally disposed in the cylinder 25. The annular port openings between the inclined annular side walls 30 and 31 and the adjacent peripheral extremities of the piston 24 are then equal and the liquid flows at the desired proportionate speeds through the pipes 2c and 3c. If, however, greater resistance is offered to the flow through the pipe 3c greater static pressure is built up in the chamber 29. This increased pressure then operates against the adjacent end of the piston 24 and moves it in the direction of the arrow 35. This movement increases the port opening between the wall 31 and the adjacent piston extremity and permits a greater flow through the pipe 3c, and at the same time reduces the port opening between the wall 30 and the end of the piston adjacent thereto. This movement continues until the speeds of flow of the liquid through the two branches 2c and 3c assume the desired proportion irrespective of the amount of resistance encountered by the column of liquid passing through each pipe.

In the arrangement shown in Figures 2 and 3, a passage 1d extends through the cylinder 25 in communication with the main 1c, and terminates in a chamber 50 having laterally disposed outlets 2d and 3d opening into the branches 2c and 3c respectively. In the chamber 50 ball valves 36 and 37 are provided which close the outlets 2d and 3d respectively from the said chamber so long as the liquid pressure from the main 1c is greater than the liquid pressure in the branches 2c and 3c, but as soon as the liquid pressure in the main drops below that in the said branches the balls 36 and 37 leave their seats and liquid under pressure in the branches flows back to the main through the passage 1d.

In the diagrammatic view shown in Figure 4, a main 1f is shown connected to one of my control devices 41 by which the proportionate flow of liquid under pressure through the branches 2f and 3f is regulated. In the present instance it will be noted that the branch 3f is greater than the branch 2f in cross section to permit the amount of flow through these branches to be at a ratio of 2:1. However other means may be employed for obtaining these relative amounts. The branch 3f terminates in a second similar regulating device 42 from which two branches 3g and 4g extend, and through which the speed of flow of the liquid is equalized by the said device 42. Thus the flow speed through all the branches 2f, 3g and 4g may be constantly equalized. It is understood, of course, that the controls indicated at 41 and 42 may be of the type shown in either Figure 1 or 2.

What I claim as my invention and desire to secure by Letters Patent is:

1. A control device for regulating the flow of liquid under pressure comprising a cylinder having a chamber formed at each extremity, a piston in the cylinder extending into said chambers, the walls of the latter being so formed that movement of the piston varies the size of annular ports formed around said piston intermediately of the length of the chambers, means through which liquid at equal pressure is admitted into each chamber on one side of its annular port, and a pipe extending from each chamber on the other side of its annular port through which the liquid from one chamber flows whereby increased resistance encountered by the liquid flowing through one pipe increases the pressure in the chamber through which that liquid flowed thereby increasing the pressure against the extremity of the piston in that chamber, said increased pressure being adapted to move the piston to increase the size of the port in that chamber and to correspondingly decrease the port in the other chamber.

2. Mechanism for dividing a supply of liquid under pressure and maintaining constant a predetermined proportion of flow through two passages communicating therewith comprising a cylinder having enlarged chambers at each end, the outer side wall of each chamber being tapered to form a tapered annular wall portion, a piston in said clinder extending, when centered in the cylinder, into each said chamber but terminating short of the tapered portion of the end walls thereof whereby annular ports are formed around the peripheries of the piston ends, said ports being variable on movement of the piston in the cylinder, an inlet passage intermediate the ends of said cylinder, communicating passages in said piston permitting a flow of liquid from the inlet passage through the piston into each end chamber, and outlet passages opening into said cylinder at points centrally disposed thereof with reference to said chambers and communicating therewith.

3. The mechanism of claim 2 wherein means are provided for relieving the liquid pressure in either outlet passage when the same is greater than that in the inlet passage.

4. The mechanism of claim 2 wherein means are provided for relieving the pressure in either outlet passage when the same is greater than that in the inlet passage, said means comprising a valved communicating passage between each outlet passage and the inlet passage.

5. A control device for proportionately regulating the flow of liquid under pressure through two pipes comprising a cylinder having an enlarged chamber formed in each extremity thereof, each said chamber including, respectively, an annular end wall section tapering toward the outer end of the chamber, a pipe extending from the inside portion of each chamber, a piston in said cylinder extending into each chamber and forming annular ports between its respective peripheral extremities and the tapered portions of said chambers, and means for introducing liquid under pressure into the outer end portions of said chambers, said liquid being adapted to flow through said annular ports to said pipes, whereby increased pressure of the liquid in one pipe increases the static pressure in the outer end portion of the chamber connected thereto and moves said piston to increase the area of the port in communication with that pipe to thereby reduce the area of the annular port communicating with the other pipe.

6. A control device for porportionately regulating the flow of liquid under pressure through two pipes comprising the combination set forth in claim 5, wherein the means for introducing the liquid under pressure into the chambers consists of a main extending through the cylinder intermediately of its length, the piston having radial passages therethrough in registry with said main in all positions of the piston, and the latter also having longitudinal apertures therethrough connecting said passages with the outer portions of the chambers.

7. The control device set forth in claim 5 wherein the liquid-introducing means comprises a main opening into the cylinder and means effecting the flow of liquid from said main at all times through the cylinder into the outer end portions of both chambers.

8. A control device for proportionately regulating the flow of liquid under pressure through two pipes comprising the combination set forth in claim 5, wherein valved means are provided adapted to permit the return of liquid under pressure from both pipes to the main when the liquid pressure in said pipes exceeds the pressure in the main.

FRIEDRICH KLEIN.